N. Newman,
Corn Harvester.
No. 105,716.   Patented July 26, 1870.
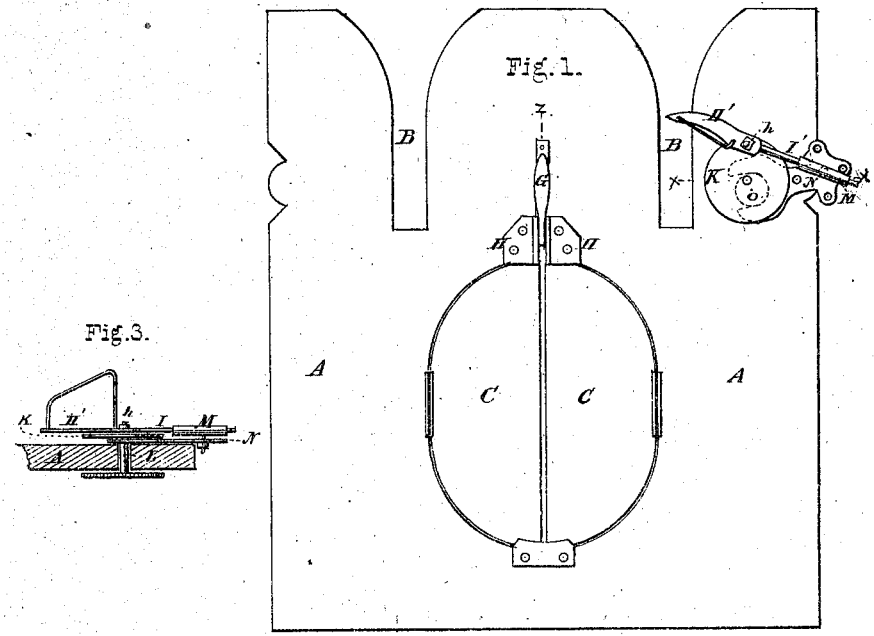
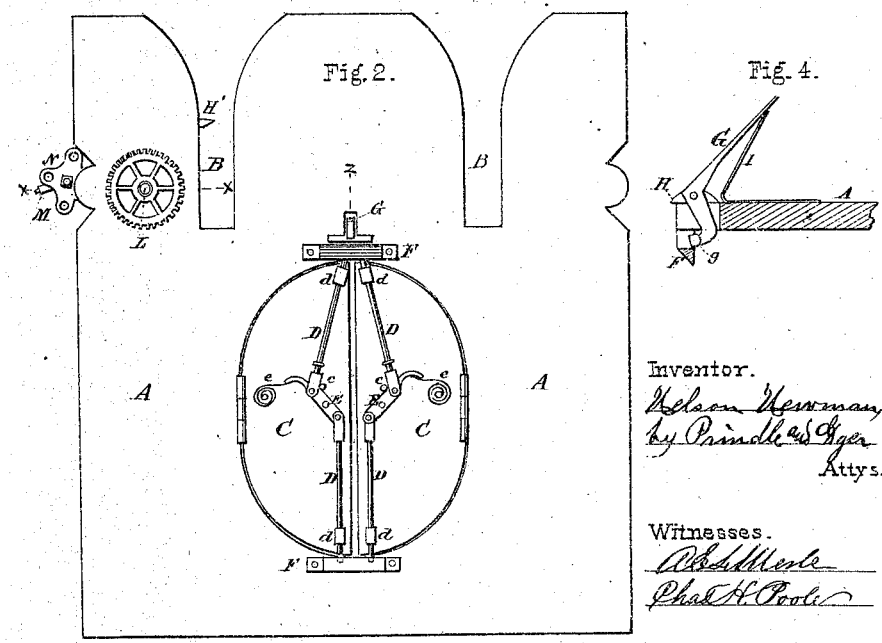
Inventor.
Nelson Newman,
by Prindle & Ager
Attys.
Witnesses.

United States Patent Office.

NELSON NEWMAN, OF SPRINGFIELD, ILLINOIS.

Letters Patent No. 105,716, dated July 26, 1870.

IMPROVEMENT IN CORN-HARVESTERS.

The Schedule referred to in these Letters Patent and making part of the same.

*To all whom it may concern:*

Be it known that I, NELSON NEWMAN, of Springfield, in the county of Sangamon and State of Illinois, have invented a new and useful Device for Cutting Corn, to be attached to corn-harvesters; and do hereby declare that the following is a full, clear, and exact description thereof, reference being had to the accompanying drawing making a part of this specification, in which—

Figure 1 is a plan view of the upper side of the platform;

Figure 2 is a like view of the lower side of said platform;

Figure 3 is a vertical cross-section of said platform on the line $x\,x$ of figs. 1 and 2, giving a side elevation of the cutting devices; and Figure 4 is a vertical longitudinal section of said platform, on the lines $z\,z$ of figs. 1 and 2, showing the lever for releasing the swinging doors.

Letters of like name and kind refer to like parts in each of the figures.

My invention relates to a class of harvesters used for cutting and shocking corn, and It consists, principally, in the means employed for operating the cutter, so as to cause it to pass, and then cut the stalks composing each successive hill, as is hereinafter shown.

It also consists in the means employed for securing, in a horizontal position, the hinged portions of the platform, and for releasing the same when it is desired to drop the shock of corn resting thereon, as is hereinafter set forth.

In the annexed drawing—

A represents the platform, provided at its front end with two gathering notches B, and at its center with an opening for the passage of shocks of corn to the ground, which opening is closed by means of two nearly semicircular doors C, hinged at their outer edges to the contiguous portions of the platform.

In order that the traps or doors may be secured in a horizontal position, or, when desired, released, and permitted to swing downward, the following described devices are employed.

Upon each door are two rods D, pivoted at their inner ends to or upon opposite ends of a short lever, E, which is in turn pivoted upon the lower side of said door at its longitudinal center, and is provided with a spring, e, which, being secured to said door, and bearing against one end of said lever, holds the latter against a stop, c, in the position shown in fig. 2.

The outer end of each rod D is squared, and passing through a suitable bearing, d, attached to the door, extends sufficiently beyond the latter to engage with a catch, F, secured to and projecting downward and across from the lower side of the platform, and thereby lock said door in a horizontal position.

A lever, G, pivoted within a suitable bearing, H, secured to and upon the platform immediately in front of the doors, and having upon its lower end a transverse bar, g, which bears against the forward ends of the locking bars or rods D, furnishes a means whereby said bars may be pressed inward, and released from engagement with the catch F.

A spring, I, secured to the platform, and bearing against the upper end of the lever G, holds the latter in an upright position, except when depressed with the foot, for the purpose of releasing the doors.

As seen in fig. 1, the cutter H' consists of a curved knife, having secured to its heel a round rod or bar, I', which extends from thence outward, in a line with said cutter.

The cutter H' is pivoted at $h$, to or upon the face of a circular disk, K, which is secured to the upper end of a vertical shaft, L, that, extending downward through the platform, is caused to rotate by means of suitable mechanism, connected with and actuated by means of the traction-wheels, so that, if said cutter be held in a position at or nearly at a right angle to the line of draft, the motion of said disk will cause it to be alternately thrust inward across the gathering-notch B, carried rearward beyond said notch, withdrawn, and carried forward to its first position.

In order that the necessary motion may be imparted to the rear end of the cutter H', the bar I' is fitted loosely to or within a slide, M, pivoted upon the rear end of a lever, N, which is pivoted at its longitudinal center upon the platform A, and provided at its inner end with a semicircular opening, $n$, which embraces an eccentric, O, secured to or upon the shaft L, and set directly opposite the pin $h$.

As thus arranged, the rear end of the lever N is thrown to the front or rear at the same time, and in the same direction as is the pin $h$, and the cutter, by which means the bar I' is caused to follow, in a measure, the motions of said cutter in a line with the draft, and keep it in a position at about a right angle therewith.

By properly adjusting the length of the lever N outside of its axial pivot, the cutter may be caused to assume and retain any desired angle with relation to the line of draft.

The same result might be obtained by dispensing with the lever and sleeve, and employing a second disk, corresponding in size with and placed to one side of the disk K, and so connected therewith as to have a relative rotary motion.

The cutter and bar being pivoted to corresponding sides of said disks, would at all times retain the same relative angle to the line of draft.

The especial advantages obtained by these improvements are simplicity and cheapness of construction, combined with ease and efficiency of operation.

Having thus fully set forth the nature and merits of my invention,

What I claim as new is—

The cutter H, operated by means of and combined with the bar I', secured to and forming a part of said cutter, the disk K, the shaft L, the sleeve M, the lever N, and the eccentric O, substantially as shown.

Also, the means employed for securing in position the hinged doors or traps C, consisting of the locking bars D, the pivoted levers E, the bearings d, the catches F, and the springs e, when arranged and operating substantially as set forth.

Also, in combination with the above-named locking devices, the pivoted lever G, provided with the bar g and spring I, substantially as and for the purpose specified.

In testimony that I claim the foregoing, I have hereunto set my hand this 23d day of May, 1870.

NELSON NEWMAN.

Witnesses:
    GEO. O. MARCY,
    W. W. MOSHER.